Patented Sept. 28, 1943

2,330,440

UNITED STATES PATENT OFFICE 2,330,440

METHOD AND MEANS FOR PRODUCTION OF AQUEOUS HYDROGEN CHLORIDE

Aylmer H. Maude, Niagara Falls, N. Y., assignor to Hooker Electrochemical Company, Niagara Falls, N. Y., a corporation of New York Application February 1, 1941, Serial No. 377,072

9 Claims. (Cl. 23—156)

My invention relates more particularly to the synthesis of hydrogen chloride, by burning hydrogen and chlorine together, and immediate absorption of the gas in water. One object of my invention is to provide a burner of simple air tight construction. Another object of my invention is to facilitate cooling of the burner. Still another object of my invention is to secure immediate absorption of the synthetic HCl in water, without the use of the extensive system of tourils heretofore found necessary for the purpose.

In the pursuance of these objectives, I employ a burner comprising concentric tubes constructed preferably of graphite and immerse the burner tip and flame in a body of water, whereby the gas is almost instantly absorbed.

Referring to the drawing.

Figures 1, 2:
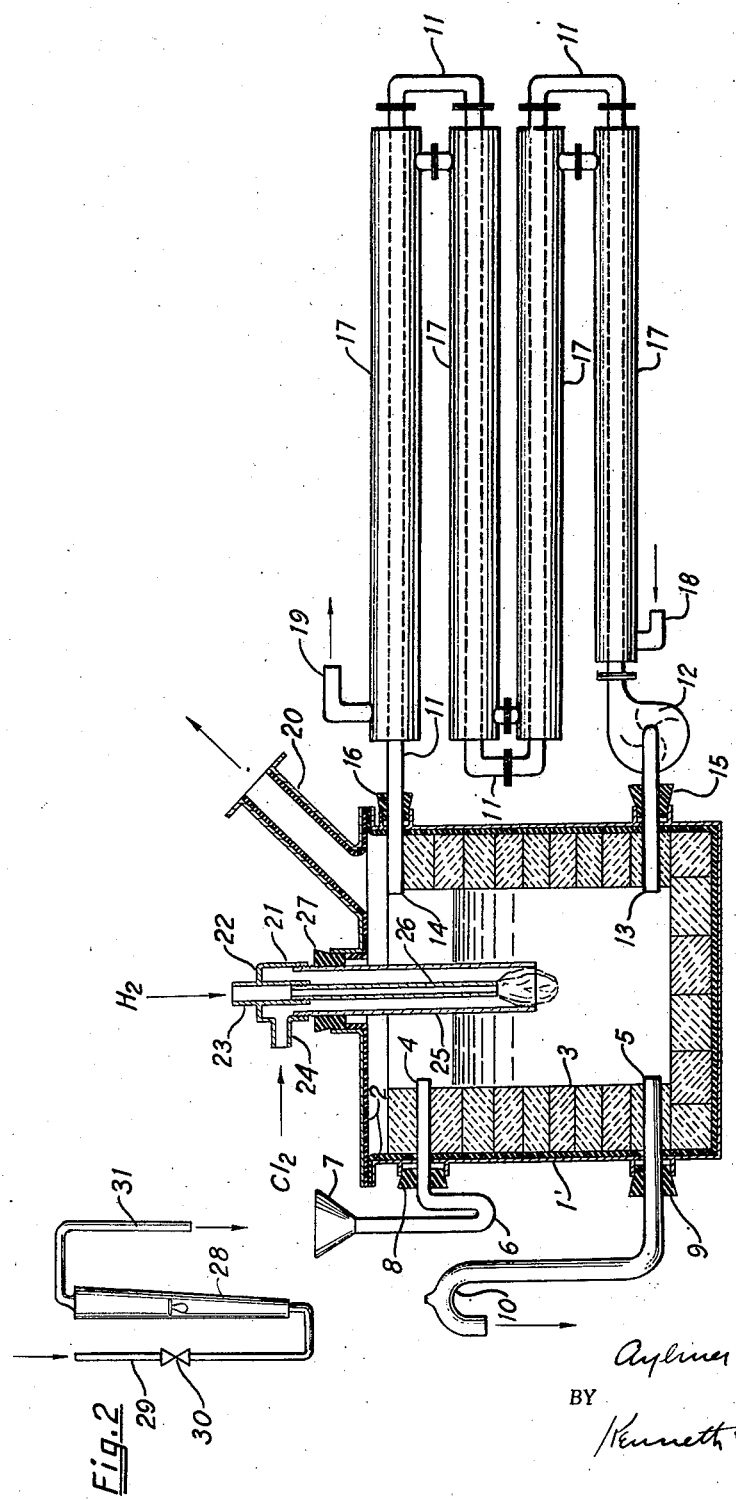
Fig. 1 is an elevation, partly in section, of apparatus for burning hydrogen and chlorine together and absorbing the hydrochloric acid gas in water, in accordance with my invention.
Fig. 2 is an elevation of a meter and connecting pipes for admitting water to the apparatus of Fig. 1 at a metered rate.

Referring to Fig. 1:

1 is a steel tank lined with rubber 2 and vitreous brick 3. Tank 1 is provided with water inlet 4 and an outlet for the aqueous acid 5. Inlet 4 communicates with tank 1, preferably near its upper portion and is provided with water seal 6 and funnel 7. Inlet 4 is let in through an opening in the side of tank 1 rendered gas tight by rubber stopper 8. Outlet 5 communicates with the interior of tank 1 near its bottom and is let in through an opening in its wall rendered liquid tight by stopper 9. Outlet 5 is bent upward and recurved to form a goose neck with a high point at 10. Tank 1 is thereby caused to stand full of liquid to the level of goose neck 10. Pipe 11 is a coil which with pump 12 forms a cooling system connected to tank 1 by pipes 13 and 14, through openings which are sealed by stoppers 15 and 16. Coil 11 is provided with jacket 17, having water inlets and outlets at 18 and 19 respectively. Liquid is withdrawn from tank 1 at 13 by pump 12 and returned through pipe 14. 20 is a vent for such inert gases as may find their way in with the hydrogen or chlorine. Vent 20 serves to render it possible and practicable to use quite impure gases, such as gases diluted with nitrogen, oxygen, carbon dioxide, etc.

The burner proper is constructed of steel pipe coupling 21, closed at its outer end by plate 22, except for pipe nipple 23, which is let in through plate 22 and welded thereto. Pipe nipple 24 is welded to the side of coupling 21. Nipple 23 serves as the inlet for hydrogen and nipple 24 for chlorine or vice versa. Nipple 23 extends through coupling 21 past the mouth of nipple 24. The lower end of coupling 21 is threaded and has screwed into it one end of tube 25, preferably of graphite. Nipple 23 is likewise threaded and has screwed into it one end of tube 26, likewise preferably of graphite. Tube 25 is co-axial with coupling 21 and tube 26 with nipple 23, hence tubes 25 and 26 are concentric. Tube 25 preferably extends vertically downward through an opening in the cover of tank 1 which is sealed by stopper 27. Tube 25 extends for some distance below the surface of the liquid in tank 1. Tube 26 preferably terminates somewhat short of tube 25.

Referring to Fig. 2:

28 is a flow meter, to which water is supplied by pipe 29, under control of valve 30, and from which it flows through pipe 31 to funnel 7.

The operation of the apparatus is as follows: With tank 1 empty of water, and the gases flowing at a reduced rate, the gases are ignited so as to produce a small flame. Water is then admitted to tank 1 and allowed to rise above the level of the burner tip and overflow through the goose neck. When the water starts to overflow the rate of admission of the gases may be increased. In practice, I prefer to admit the gases at a velocity of about 20 feet per second.

The concentration of the acid produced is preferably 32 to 36 per cent, but somewhat stronger acid may be produced if desired. Weaker acid may of course be produced, but in general this is not desired. To minimize cooling, the acid is allowed to heat up to just below the temperature at which uneconomic fuming would begin. When using concentrated hydrogen and chloride, this temperature is about 10° C. below the boiling point of the acid. Under these conditions, in the case of the 32 per cent acid a practicable temperature is 71° C. and in the case of the 36 per cent acid it is 46° C. When producing weaker acids from the concentrated gases the temperature may be somewhat higher, but when the acid is stronger or the gases diluted the temperature must be kept still lower. The flame coming into contact with the water blows it away far enough to form a small combustion chamber in the water itself. The size of this chamber depends upon the rate of admission of the gases. It must of course be of such a volume that its surface will be sufficient for absorption of the HCl by the water. The affinity of water for HCl is such that this chamber is found to be surprisingly small. The drawing in fact gives a very good idea of the size of the combustion chamber in the body of water. Under these conditions the combustion proceeds smoothly, with no reverberation, objectionable evolution of fumes or generation of steam. When using pure gases, once the flame is established, by observing the surface of the liquid through an observation glass window (not shown) the rate of admission of the gases can be regulated so that there is little bubbling of excess gases upward to the surface of the liquid. The temperature of the acid in tank 1 depends upon the quantity of HCl formed in a unit of time per unit of volume, the strength of the aqueous acid, and the rate of circulation of the acid and other cooling factors. The rates of admission of water through pipe 4 and gases through pipes 23 and 24 are regulated so that acid of the desired strength issues from pipe 5, and the flow of cooling water is regulated so that the body of liquid in the tank is kept at the desired temperature, depending upon the concentration of the acid to be produced. Once these adjustments have been made, the apparatus requires no further attention for considerable periods of time. As the burner tip is immersed in the acid no overheating of the burner is possible. The threaded graphite tubes make very good joints with the steel coupling 2 and nipple 23, so that no air is drawn in or gases allowed to escape.

It will also be noted that as the HCl is produced in contact with water, the absorption is practically instantaneous and no other absorption apparatus whatever is required.

Although I have described my burner as constructed of graphite tubes, I do not wish to be limited thereto, as other heat and oxygen resistant materials, such as silica, are available.

I claim as my invention:

1. The method of synthesizing hydrogen chloride and effecting immediate absorption of the hot product to produce aqueous hydrochloric acid of commercial concentration, which comprises bringing gaseous elemental hydrogen and chlorine together and causing them to react in an open mouthed combustion chamber submerged in a body of the acid and in direct heat transfer relation therewith through walls of material substantially inert with respect to the acid and of good heat conductivity and high heat resistance; causing the resulting combustion flame to impinge directly upon the surrounding acid; and maintaining the acid everywhere at not substantially less than 10° C. below the boiling point of the acid by effective circulation and cooling.

2. The method of synthesizing hydrogen chloride and effecting immediate absorption of the hot product to produce aqueous hydrochloric acid which comprises bringing gaseous elemental hydrogen and chlorine together and causing them to react in an open mouthed combustion chamber submerged in a body of the acid and in direct heat transfer relation therewith through walls of material substantially inert with respect to the acid and of good heat conductivity and high heat resistance; causing the resulting combustion flame to impinge directly upon the surrounding acid; supplying water to maintain the acid at commercial concentration; maintaining the acid everywhere at not substantially less than 10° C. below the boiling point of the acid by effective circulation and cooling; and withdrawing the acid thus produced.

3. The method of synthesizing hydrogen chloride and effecting immediate absorption of the hot product to produce aqueous hydrochloric acid which comprises bringing gaseous elemental hydrogen and chlorine together and causing them to react in an open mouthed combustion chamber submerged in a body of the acid and in direct heat transfer relation therewith through walls of material substantially inert with respect to the acid and of good heat conductivity and high heat resistance; causing the resulting combustion flame to impinge directly upon the surrounding acid; supplying water to maintain the acid at commercial concentration; maintaining the acid everywhere at not substantially less than 10° C. below the boiling point of the acid by mechanical circulation through an external cooling system; and withdrawing the acid thus produced.

4. The method of synthesizing hydrogen chloride and effecting immediate absorption of the hot product to produce aqueous hydrochloric acid which comprises bringing gaseous elemental hydrogen and chlorine together below the surface of a body of the acid and causing them to react in an open mouthed combustion chamber submerged in the acid and in direct heat transfer relation therewith through walls of material substantially inert with respect to the acid and of good heat conductivity and high heat resistance; causing the resulting combustion flame to impinge directly upon the surrounding acid; supplying water to maintain the acid at commercial concentration; maintaining the acid everywhere at not substantially less than 10° C. below the boiling point of the acid by effective circulation and cooling; and withdrawing the acid thus produced.

5. The method of synthesizing hydrogen chloride and effecting immediate absorption of the hot product to produce aqueous hydrochloric acid which comprises bringing gaseous elemental hydrogen and chlorine together and causing them to react in an open mouthed combustion chamber submerged in a body of the acid and in direct heat transfer relation therewith through walls of infusible material substantially inert with respect to the acid and of good heat conductivity; causing the resulting combustion flame to impinge directly upon the surrounding acid; supplying water to maintain the acid at commercial concentration; maintaining the acid everywhere at not substantially less than 10° C. below the boiling point of the acid by effective circulation and cooling, and withdrawing the acid thus produced.

6. The method of synthesizing hydrogen chloride and effecting immediate absorption of the hot product to produce aqueous hydrochloric acid of a concentration not substantially below 32 nor above 36 per cent which comprises bringing gaseous elemental hydrogen and chlorine together and causing them to react in an open mouthed combustion chamber submerged in a body of the acid and in direct heat transfer relation therewith through walls of material substantially inert with respect to the acid and of good heat conductivity and high heat resistance; causing the resulting combustion flame to impinge directly upon the surrounding acid; supplying water to maintain the acid at said concentration; maintaining the acid everywhere at between substantially 71° and 46° C., by effective circulation and cooling; and withdrawing the acid thus produced.

7. The method of synthesizing hydrogen chloride and effecting immediate absorption of the hot product to produce aqueous hydrochloric acid which comprises bringing gaseous elemental hydrogen and chlorine independently into and causing them to react in an open mouthed combustion chamber submerged in a body of the acid and in direct heat transfer relation therewith through walls of material substantially inert with respect to the acid and of good heat conductivity and high heat resistance; causing the resulting combustion flame to impinge directly upon the surrounding acid; supplying water to maintain the acid at commercial concentration; maintaining the acid everywhere at not substantially less than 10° C. below the boiling point of the acid by effective circulation and cooling; and withdrawing the acid thus produced.

8. The method of synthesizing hydrogen chloride and effecting immediate absorption of the hot product to produce aqueous hydrochloric acid which comprises bringing gaseous elemental hydrogen and chlorine together and causing them to react in an open mouthed combustion chamber submerged in a body of the acid in an absorption chamber of material inert with respect to the acid and provided with an outflow determining a minimum level of the acid therein, said combustion chamber being in direct heat transfer relation with said acid through walls of material substantially inert with respect to the acid and of good heat conductivity and high heat resistance; causing the resulting combustion flame to impinge directly upon the surrounding acid; supplying water to said body of acid to absorb the hydrogen chloride formed and maintain the acid at commercial concentration; maintaining the acid everywhere at not substantially less than 10° C. below the boiling point of the acid by effective circulation and cooling; and withdrawing the acid thus produced through said outflow.

9. The method of synthesizing hydrogen chloride and effecting immediate absorption of the hot product to produce aqueous hydrochloric acid which comprises continuously bringing gaseous elemental hydrogen and chlorine together and causing them to react in an open mouthed combustion chamber submerged in a body of the acid and in direct heat transfer relation therewith through walls of material substantially inert with respect to the acid and of good heat conductivity and high heat resistance; causing the resulting combustion flame to impinge directly upon the surrounding acid; continuously supplying water to said body of acid to absorb the hydrogen chloride formed, at a rate co-related with the rate of formation of the hydrogen chloride, to maintain the acid at commercial concentration; maintaining the acid everywhere at not substantially less than 10° C. below the boiling point of the acid by effective circulation and cooling; and continuously withdrawing the acid as thus produced.

AYLMER H. MAUDE.